March 9, 1948. E. BRUEGGER 2,437,500
APPARATUS FOR BENDING METAL STRIPS EDGEWISE IN MAKING HELICAL FINS
Filed Sept. 8, 1944 5 Sheets-Sheet 1

INVENTOR
ERNEST BRUEGGER
BY Pennie, Davis, Marvin & Edmonds
HIS ATTORNEYS

March 9, 1948. E. BRUEGGER 2,437,500
APPARATUS FOR BENDING METAL STRIPS EDGEWISE IN MAKING HELICAL FINS
Filed Sept. 8, 1944 5 Sheets-Sheet 4

INVENTOR
ERNEST BRUEGGER
BY
HIS ATTORNEYS

March 9, 1948.     E. BRUEGGER     2,437,500
APPARATUS FOR BENDING METAL STRIPS EDGEWISE IN MAKING HELICAL FINS
Filed Sept. 8, 1944     5 Sheets-Sheet 5

INVENTOR
ERNEST BRUEGGER
BY
Pennie, Davis, Marvin & Edmonds
HIS ATTORNEYS

Patented Mar. 9, 1948

2,437,500

UNITED STATES PATENT OFFICE 2,437,500

APPARATUS FOR BENDING METAL STRIPS EDGEWISE IN MAKING HELICAL FINS

Ernest Bruegger, Massillon, Ohio, assignor to The Griscom-Russell Company, New York, N. Y., a corporation of Delaware Application September 8, 1944, Serial No. 553,153

7 Claims. (Cl. 153—64.5)

This invention relates to the manufacture of fins and more particularly concerns improved apparatus for making helical fins useful in the manufacture of cylindrical elements from or to which heat is transferred, such as cylinders for internal combustion engines.

Many devices and processes require the rapid transmission of considerable quantities of heat from or to a tubular or cylindrical body. For example, cylinders of internal combustion engines employed in aircraft must be cooled to prevent failure of these or other parts of the engine in operation. The power output of such engines for a given piston displacement has recently been greatly increased by the use of high compression ratios and new fuels, and this increase necessitates an increase in the heat radiating capacity of the cylinders to prevent overheating.

Heat radiating fins for air-cooled engine cylinders have been produced by casting or machining them directly on and integral with the cylinder wall or a sleeve attached to the cylinder. These procedures are expensive, provide but a limited increase in the heat dissipating surface and in general produce cylinders which cannot be safely operated at power outputs obtainable from engines employing liquid cooled cylinders of the same piston displacement.

With the above and other considerations in mind, it is proposed in accordance with the present invention to provide an improved apparatus which produces helically coiled fins for engine cylinders or like cylindrical components, whereby cylinders with greatly extended heat radiating surfaces may be produced. Another object of the invention is to provide an apparatus which produces precoiled fin structures rapidly and inexpensively without wasting metal. A further object of the invention is to provide apparatus for use in making precoiled fins which is simple in design, easily constructed and readily adjustable and operable to produce a highly satisfactory product even in the hands of relatively unskilled workers.

The fin preferably produced by my improved apparatus is an edgewise wound helical ribbon having a heat conductive edge enlargement which may comprise a substantially L-shaped foot along its inner edge. The bottom of this foot engages the cylindrical surface to which the fin is secured, and the end of the foot engages the face of an adjacent turn of the fin and thereby provides the proper spacing between the fin turns. I have found that attempts to bend the L-shaped foot along the inner edge of the fin to final form while bending a straight metallic ribbon into a helical coil result in buckling or other improper or irregular bending of the fin metal, and that with such procedure it is difficult to control the width and thickness of the foot element. I have devised a method and apparatus in which a straight metallic ribbon is first bent edgewise into a helical coil while its inner edge portion is displaced at an angle of less than 90° to the remainder of the fin, and in which the precoiled fin thus produced is then continuously bent along its inner edge to finish the foot bend so as to dispose the foot normal to the radially extending fin. My improved method is claimed in my copending application Serial No. 734,960, filed March 15, 1947, which is a division of the present application.

My improved apparatus generally includes an improved precoiling machine for forming a continuous straight metallic ribbon into an edgewise wound flat helical coil with an angularly disposed marginal inner edge portion. This precoiling machine may also be used to form helical coils without any inner edge displacement. The apparatus also includes a beading machine which continuously forms the angularly displaced inner edge of the precoiled ribbon into an L-shaped foot. My improved bending machine is claimed in my copending application Serial No. 734,961, filed March 15, 1947, which is a division of the present application.

In describing the invention in detail, reference will be made to the accompanying drawings in which a typical embodiment of my improved apparatus suitable for carrying out my improved method has been illustrated. In the drawings.

In general, the precoiling machine of the invention employs a pair of cooperating discs of different diameter having marginal end faces so disposed as to pinch or grip a straight metallic ribbon therebetween and bend it continuously about a circular surface into a continuous edgewise wound helical coil. The gripping or pinching action of the disc end faces is obtained by disposing the discs with their axes adjacent but at a small angle to each other so that the ribbon gripping faces are close to each other and in peripheral alignment at and near the point where the gripping of the ribbon takes place, and are spaced more widely apart and radially displaced at other points in their rotation. In order that the coiled ribbon may progress outwardly from the bending machine, the circular surface about which it is bent is disposed eccentrically with respect to the discs and preferably comprises a ring running on a shoulder of one of the discs and having an outer circular edge which forms the surface about which the ribbon is bent. This outer edge of the ring is disposed radially inward from the edge of the forming discs at the point where their faces grip the ribbon, but is substantially aligned with the outer periphery of the smaller of these discs at a diametrically opposite point. With this arrangement, the coiled ribbon is bent about the circular surface between the discs and moves outward axially of the discs over the peripheries of the smaller disc in a continuous coil.

Figure 1:
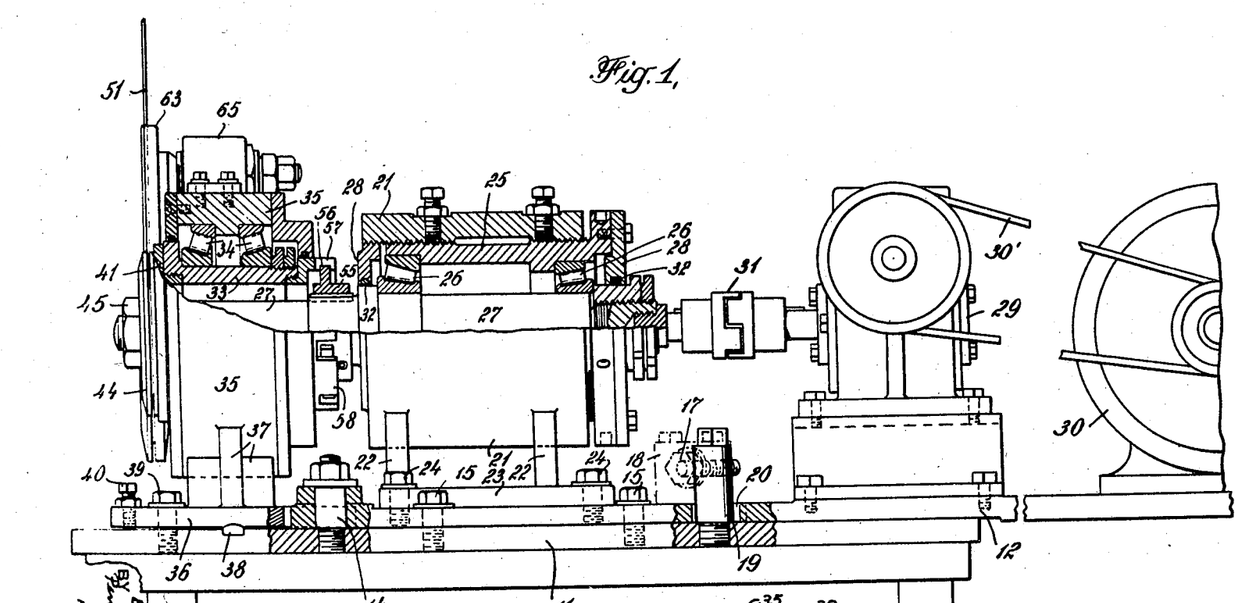
Fig. 1 is an elevation partly in section, of a ribbon coiling machine embodying the invention.
Figures 2, 3, 4:
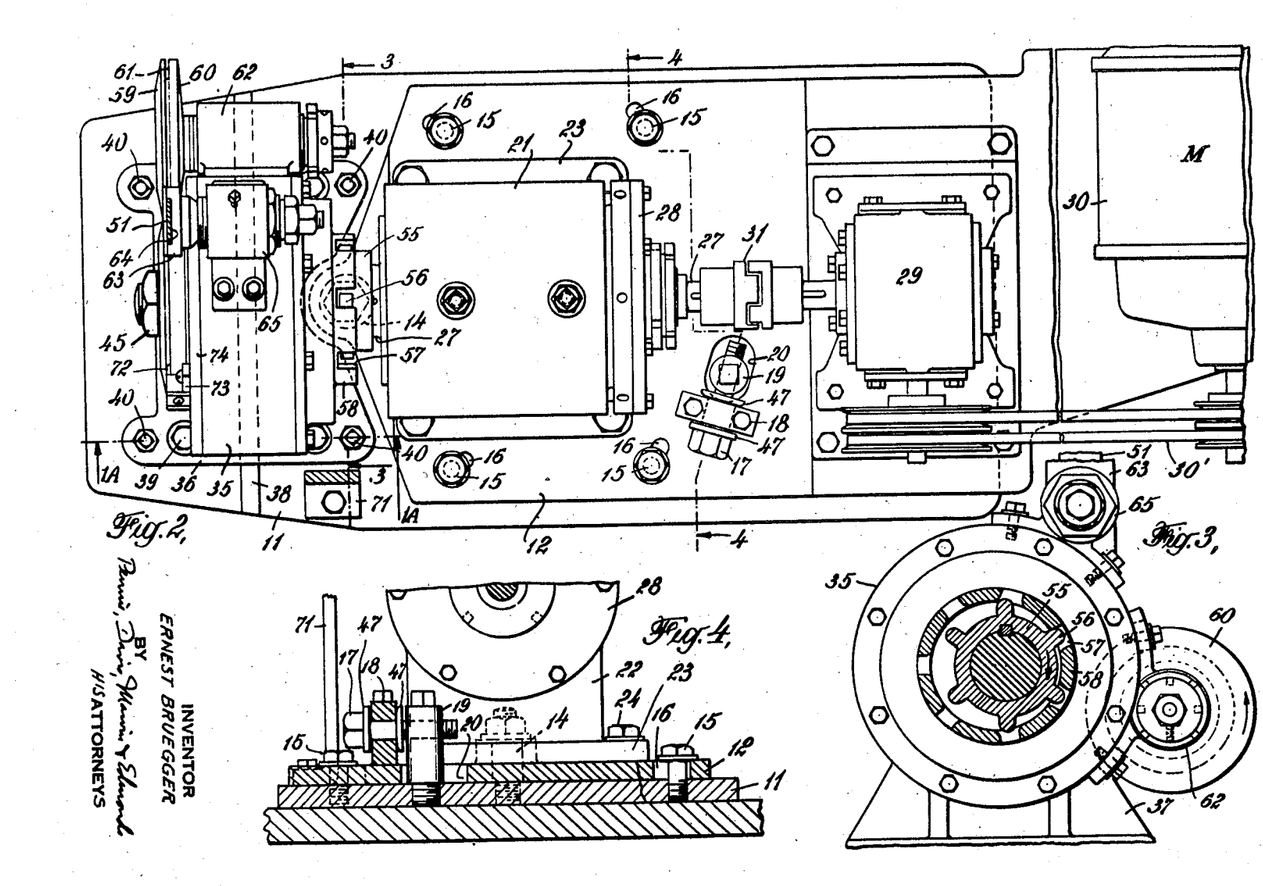
Fig. 2 is a plan view of the machine illustrated in Fig. 1.
Fig. 3 is a sectional view taken along the line 3—3 of Fig. 2 and viewed in the direction of the arrows.
Fig. 4 is a sectional view taken along the line 4—4 of Fig. 3 and viewed in the direction of the arrows.

Referring to Figs. 1 through 6, the disclosed embodiment of my improved precoiling machine includes a stationary base 11 carrying a swivel plate 12. The plate 12 is pivotally connected to the base 11 by a pin 14 threadedly secured to the base and extending through a boss in the swivel plate 12. The plate 12 is releasably clamped to the base 11 by a plurality of bolts 15 passing through slots 16 in the plate 12 and threadedly engaging the base 11. When the bolts 15 are loosened, the swivel plate 12 may be moved in a horizontal plane about the pin 14 by an adjusting screw 17. The screw 17 is rotatably carried in a bracket 18 fixed to the plate 12 and is held against movement through this bracket by a collar 47. The adjusting screw 17 threadedly engages a post 19 which is fixed to the base 11 and passes through a slot 20 in the plate 12 (Figs. 1, 2 and 4).

A bearing housing 21 is suitably fixed to the swivel plate 12 by brackets 22, a plate 23 and screws 24. As best shown in Fig. 1, a sleeve 25 is fixed within the housing 21 and carries anti-friction bearings 26 in which a shaft 27 is journaled. The bearings 26 are preferably enclosed by end plates 28 provided with packing rings 32 to retain lubricant in the bearings.

The shaft 27 is driven by any suitable means. In the disclosed embodiment, this shaft is connected through a universal joint 31 to the output shaft of a speed reduction gearing unit 29 of known construction, and the input shaft of this unit is driven by a motor 30 through a belt 30'. Both the speed reduction gearing unit 29 and the motor 30 are fixed to the swivel plate 12.

Figure 1A:
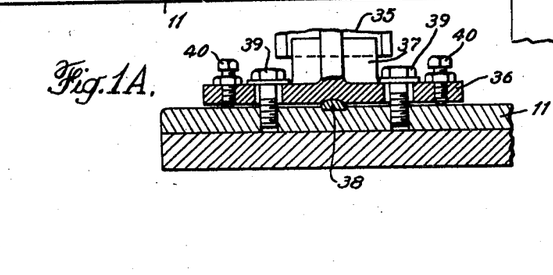
Fig. 1A is a fragmentary sectional view taken along the line 1A—1A of Fig. 2 and viewed in the direction of the arrows.

The shaft 27 extends beyond the bearing housing 21 into and through a rotary sleeve 33 which is journaled on anti-friction bearings 34 in a stationary cylindrical bracket 35. The bracket 35 is secured to a plate 36 by supports 37. The plate 36 is so mounted as to be adjustably tiltable in a substantially vertical plane about the arcuate top of a key 38 fixed in a transverse groove in the base 11, as shown in Fig. 1, 1A and 2. This adjustment permits variation of the angular position of the axis of the rotary sleeve 33. The plate 36 is normally locked to the base 11 by the machine screws 39 which pass through enlarged openings in the plate 36, and when these screws are loosened the plate 36 may be tilted by a suitable adjustment of the set screws 40 which threadedly engage the plate 36 and bear on the base 11 on opposite sides of the key 38 (Fig. 1A).

Figures 5, 6:
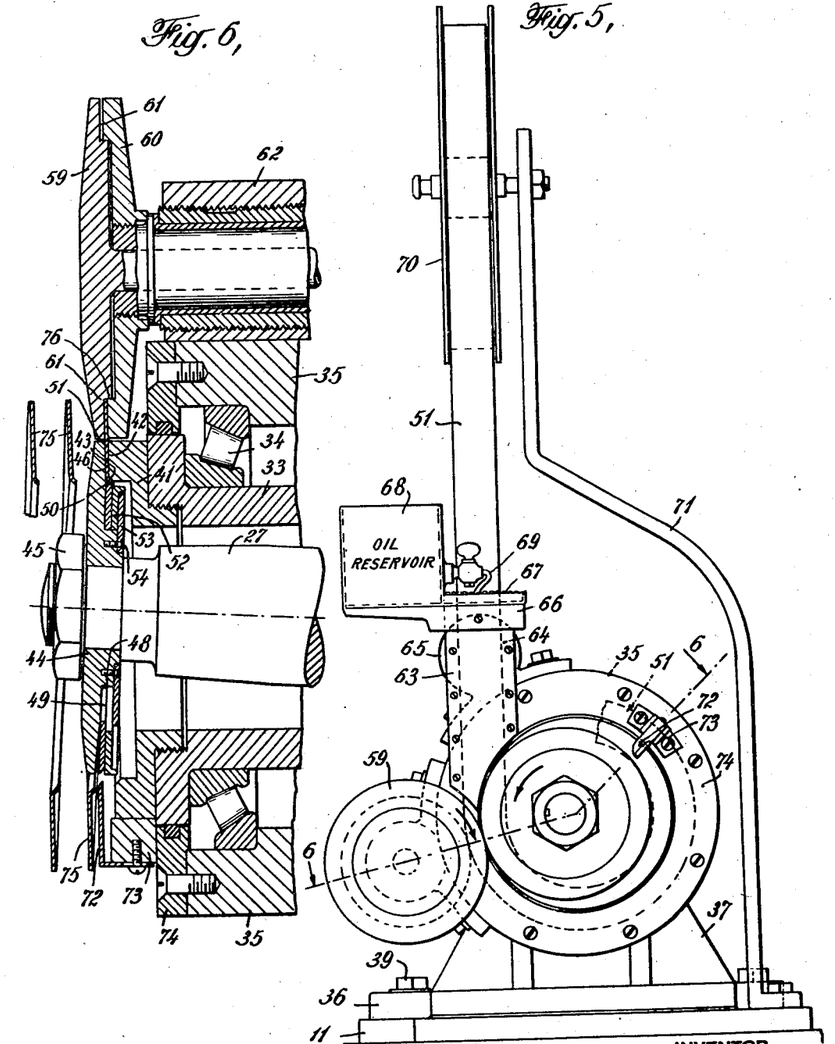
Fig. 5 is a front end elevation of the machine.
Fig. 6 is a sectional view, on an enlarged scale, taken along the line 6—6 of Fig. 5 and showing the details of the ribbon bending mechanism.

A ribbon forming disc 41, having a central aperture through which the shaft 27 passes, is fixed to the front end of the rotary sleeve 33 (Figs. 1 and 6). This disc has an outwardly disposed marginal end face 42 having a beveled inner edge 43, as shown in Fig. 6. A second ribbon forming disc 44 is fixed to the end of the shaft 27 by a nut 45 or other suitable means. The disc 44 is of considerably smaller diameter than the disc 41 and has an inwardly disposed marginal end face 46. As shown in Fig. 6, the axes of rotation of the discs 41 and 44 lie close to each other but are disposed at a small angle to each other. The arrangement is such that the marginal end faces 42 and 46 of the respective discs lie parallel to and closely adjacent each other and in substantial peripheral alignment at and near one point in the rotation of the discs, and are more widely separate and displaced radially elsewhere. This point where the disc faces most closely approach each other will be termed the pinch point herein. In the disclosed embodiment, the pinch point is slightly below a horizontal plane through the disc axes, and is substantially at the point where the line 6—6 of Fig. 5 crosses the disc faces to the left of the disc axes, as shown in that figure. The face 46 of the disc 44 is slightly conical so as to lie parallel to the face 42 of the disc 41 at the pinch point. The location of the pinch point and the spacing of the disc faces 42 and 46 may be variably adjusted by altering the angular positions of the axes of the discs 41 and 44. Swinging of the swivel plate 12 about the pin 14 alters the angular position of the axis of the outer disc 44, and tilting of the plate 36 about the arcuate key 38 alters the angular position of the axis of the inner disc 41.

The outer disc 44 has a hub forming a shoulder 48. A pilot or bending ring 49 surrounds the shoulder 48, and the inner surface of this ring engages the shoulder adjacent the pinch point. The internal diameter of the pilot ring 49 is considerably larger than the diameter of the shoulder 48. The radial width of the ring 49 is such as to bring its outer edge 50 in substantial peripheral alignment with the beveled edge 43 of the inner disc face 42 at and near the pinch point. The outer edge 50 of the pilot ring 49 is preferably beveled as shown, to lie parallel to the beveled edge 43 of the inner ring face 42. These beveled surfaces may lie at an angle of approximately 45° to the disc faces 42 and 46. The ring 49 is of such size that its outer edge 50 is substantially flush with the periphery of the outer disc 44 at a point substantially diametrically opposite the pinch point, as shown in Figs. 5 and 6.

A stationary take-off finger 72 extends radially inward over the face 42 of the inner disc 41 to a point adjacent the outer edge 50 of the pilot ring 49. The finger 72 is fixed to a block 73 secured to a face plate 74 on the cylindrical bracket 35. The finger 72 is disposed adjacent but slightly beyond a point diametrically opposite the pinch point, as shown in Fig. 5, and serves to guide the first turn of the coiled ribbon 75 outward over the edge of the outer disc 44, thus giving the coiled ribbon a lead and causing it to progress axially outward from the forming discs.

The pilot ring 49 is held in frictionally movable engagement with the inner face of the disc 44 by a guide ring 52 of substantially the same radial dimensions as the ring 49, and a retaining plate 53 is fixed to the hub of the disc 44 by the screws 54 and holds the guide ring 52 and pilot ring 49 against the inner face of the disc 44 as shown in Fig. 6. With the arrangement described, the pilot ring 49 turns about an axis parallel to but spaced laterally from the axis of rotation of the disc 44, as illustrated in Figs. 5 and 6.

A driving connection is provided between the shaft 27 and the rotary sleeve 33 so that the discs 41 and 44 rotate in the same direction and at the same angular velocity. In the disclosed embodiment, a sprocket 55 is keyed to the shaft 27 adjacent the rotary sleeve 33, and the teeth 56 of this sprocket engage openings 57 in a collar 58 fixed to the sleeve 33 as shown in Figs. 1, 2 and 3. With this arrangement, the discs 41 and 44 are driven in unison from the shaft 27 despite the angle between the axes of the discs.

A pair of spaced guide discs 59 and 60 having a peripheral slot 61 therebetween are clamped together and carried by a shaft journaled in a bracket 62 fixed to the cylindrical bracket 35. The discs 59 and 60 are disposed with their peripheries close to those of the discs 41 and 44 at or closely adjacent the pinch point, with the slot 61 aligned with and forming a continuation of the space between the marginal end faces 42 and 46, as shown in Figs. 5 and 6.

A ribbon guide 63 having a vertically extending opening 64 of rectangular section therethrough is secured to a bracket 65 fixed to the cylindrical bracket 35 (Figs. 1 and 5). The opening 64 in the ribbon guide is disposed in alignment with the space defined by the disc faces 42 and 46 and the peripheral slot 61 between the guide discs 59 and 60. An oil trough 66 is supported at the upper end of the guide 63 around the opening 64 therethrough and a wick 67 disposed in this trough is supplied with lubricant from a reservoir 68 through a valved duct 69. The metallic ribbon 51 to be coiled may be supplied to the guide 63 from a reel 70 disposed above the guide and carried by a bracket 71 fixed to the base 11 (Fig. 5).

In the operation of the disclosed embodiment of my precoiling machine, the straight metallic ribbon 51 is led down through the ribbon guide 63 and into the space between the marginal end faces 42 and 46 of the discs 41 and 44. The ribbon enters this space just above the pinch point, as shown in Fig. 5, and the guide 63 is so disposed that substantially half the width of the ribbon passes into this space, the other half entering the peripheral slot 61 between the guide discs 59 and 60. The discs 41 and 44 are rotated in unison in the direction of the arrow in Fig. 5, and the ribbon 51 is pinched between the disc faces 42 and 46 and bent edgewise around the outer edge 50 of the pilot ring 49. The ribbon 51 is firmly pressed against the ring edge 50 by the shoulder 76 forming the bottom of the guide disc slot 61. As the ribbon is bent to circular helical form, its inner edge portion is bent or offset laterally by engagement between the beveled pilot ring edge and the parallel beveled inner edge 43 of the inner disc face 42. The angle to which the inner edge portion of the ribbon is bent is less than 90° and preferably about 45° from its original position.

After passing the pinch point where it is bent, the ribbon is released by the separation of the disc faces 42 and 46. The radius of curvature of the inner edge of the ribbon approximates but slightly exceeds that of the outer edge 50 of the pilot ring 49 about which it is bent. As explained above, the pilot ring runs eccentrically with respect to the outer disc 44, and the bent ribbon 75 accordingly also runs eccentrically until its inner edge passes outward beyond the periphery of the disc 44 at or near a point diametrically opposite the pinch point. The take-off finger 72 leads the coiled ribbon 75 outward over the edge of the disc 44, and the helically coiled ribbon or fin thus progresses axially out of the mechanism.

In order to complete the process of forming an L-shaped foot along the inner edge of the ribbon, the precoiled ribbon is then subjected to the action of a beading machine which will now be described. The disclosed embodiment of my improved beading machine comprises generally two pairs of cooperating rollers 80, 81, 82 and 83 having conical surfaces between which the precoiled ribbon 75 progresses, together with two foot forming rollers 84 and 85 which respectively engage and shape the edge portion of the ribbon in cooperation with the conical surfaced rollers.

Figure 7:
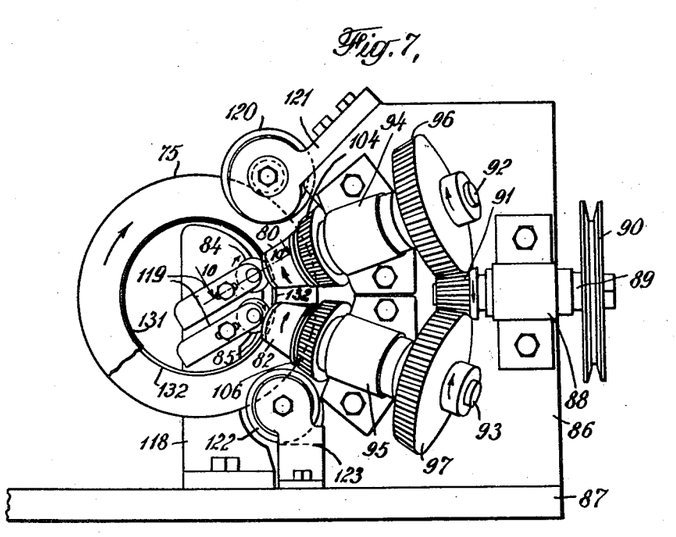
Fig. 7 is a side elevation of a beading machine embodying the invention taken from the side from which a precoiled ribbon approaches the machine.
Figure 8:
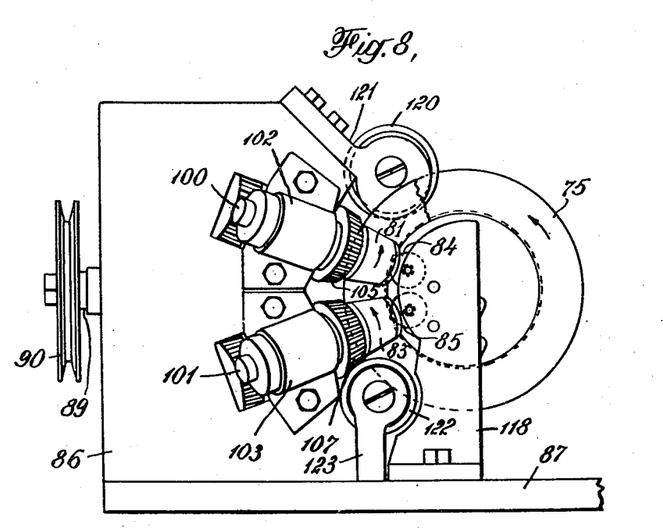
Fig. 8 is an elevation taken from the opposite side showing the machine illustrated in Fig. 7.
Figures 9, 10:
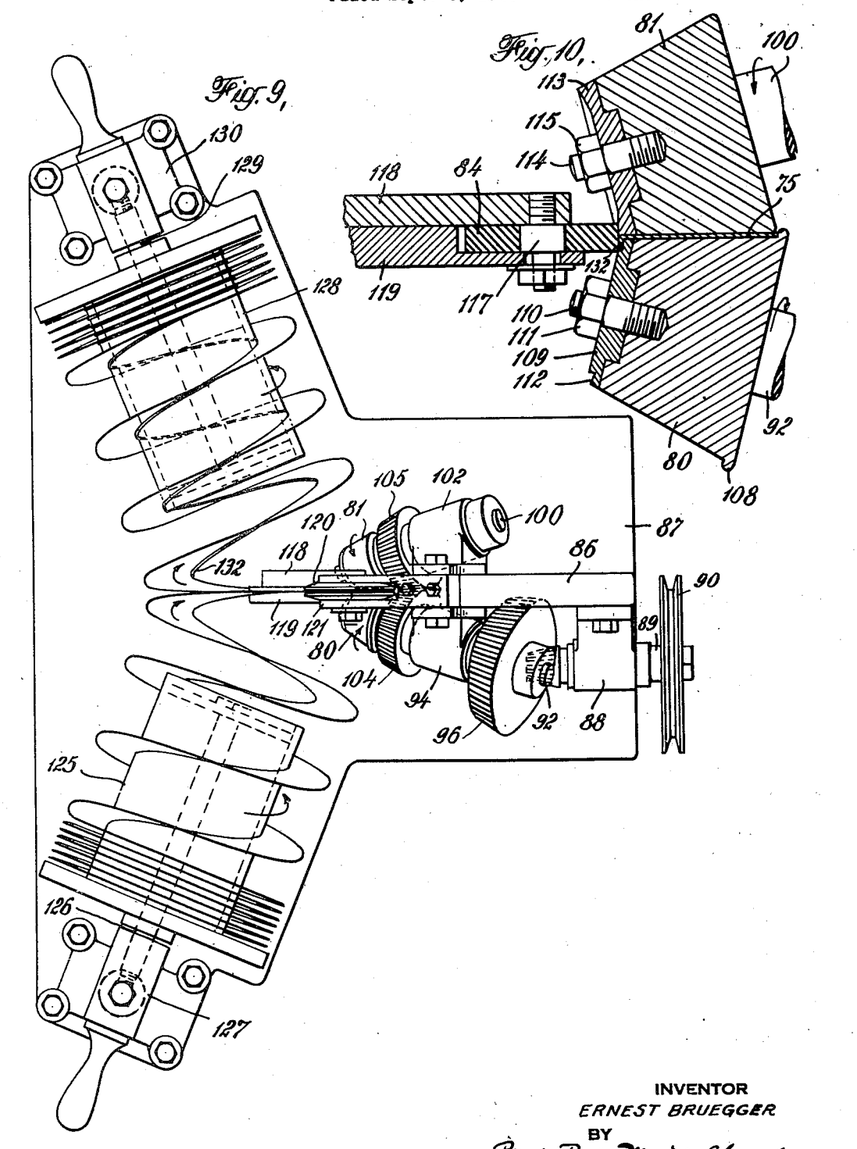
Fig. 9 is a plan view of the beading machine together with means for guiding a precoiled ribbon toward and away from the machine.
Fig. 10 is a sectional view on an enlarged scale on the line 10—10 of Fig. 7, and showing the bead forming rollers of the beading machine.

As shown in Figs. 7, 8 and 9, a vertically extending frame plate 86 is mounted on a horizontal base 87 and carries a journal bracket 88 in which a drive shaft 89 is journaled. The shaft 89 may be driven by any suitable means through a pulley 90, and carries a beveled pinion 91 at its inner end. Two angularly disposed shafts 92 and 93 are journaled in brackets 94 and 95 secured to one side of the frame plate 86 as shown in Fig. 7. The shafts 92 and 93 are convergent, the upper shaft 92 slanting downward and inward toward the plane of the plate 86 and the lower shaft 93 slanting upward and inward so that the continuations of the axes of these shafts would intersect at or approximately at the center of rotation of the precoiled ribbon 75 passing through the machine. The shafts 92 and 93 are driven in the same direction by beveled gears 96 and 97 respectively fixed to the outer ends of the shafts and meshing with the beveled pinion 91.

Two shafts 100 and 101 are journaled in brackets 102 and 103 secured to the opposite side of the frame plate 86 from the shafts 92 and 93 (Fig. 8). The shafts 100 and 101 converge as do the shafts 92 and 93, the projected axes of all of these shafts intersecting at or substantially at the center of the axis of rotation of the precoiled ribbon 75. Intermeshing beveled gears 104 and 105 are respectively secured to the shafts 92 and 100 adjacent the inner edge of the plate 86, and similar intermeshing gears 106 and 107 are respectively fixed to the shafts 93 and 101. With this arrangement, the shafts 100 and 101 are both driven in the same direction which is opposite to the direction of rotation of the shafts 92 and 93.

The inner ends of the shafts 92 and 93 carry frusto-conical ribbon gripping rollers 80 and 82 of identical design, and similar rollers 81 and 83 are similarly fixed to the inner ends of the respective shafts 100 and 101. The rollers 80 and 81 are illustrated in enlarged section in Fig. 10, and since the rollers 82 and 83 are respectively identical with the rollers 80 and 81 they will not be separately described. As shown in Fig. 10, the conical slope of the roller faces is such that projections of elements of these faces pass through the point where the projected axes of the shafts 92 and 100 intersect substantially at the axis of rotation of the coiled fin ribbon 75. The roller 80 has a bead 108 forming a shoulder adjacent its larger end, and carries a forming plate 109 fixed to its smaller end by a stud 110 and a nut 111. The marginal portion of the end face of the plate 109 has formed therein a circular recess forming a surface 112 disposed at right angles to elements of the conical surface of the roller. The roller 81 carries a forming plate 113 fixed to its smaller end by a stud 114 and a nut 115. The peripheral surfaces of the plates 113 and 109 are shaped to be aligned with and to form continuations of the conical surfaces of the respective rollers 81 and 80. The end face of the forming plate 113 is dished so as to present a marginal portion disposed at right angles to the conical surface of the roller 81. The rollers 80 and 81 are so disposed that their conical surfaces are parallel and are spaced apart a distance substantially equal to the thickness of the fin ribbon 75, the arrangement being such that the fin is tightly gripped and advanced by these rollers when they rotate. The periphery of the forming plate 113 on the roller 81 extends beyond the surface 112 in the recess of the plate 109 on the roller 80 by a distance substantially equal to the thickness of the fin metal.

A cylindrical roller 84 is rotatably supported on a pivot 117 with its axis substantially horizontal and at right angles to elements of the conical roller surfaces and its periphery engaging the marginal end face of the forming plate 113 and extending over the surface 112 of the forming plate 109. The roller pivot 117 is carried by a frame plate 118 fixed to the base 87 and by a bracket 119 fixed to the plate 118 and having a roller receiving recess in its end as shown in Fig. 10. A cylindrical roller 85, identical with the roller 84 is pivotally mounted to bear against the ends of the conical rollers 82 and 83 in the same manner as that described above in connection with the roller 84. A peripherally slotted guide roller 120 is rotatably journaled in a bracket 121 fixed to the plate 86 and is disposed above and substantially in vertical alignment with the space between the rollers 80 and 81. A similar peripherally slotted guide roller 122 is rotatably mounted in a bracket 123 below and substantially aligned with the space between the lower conical rollers 82 and 83.

Suitable means may be provided for guiding the precoiled ribbon or fin 75 to the beading mechanism and for leading the finished fin away from that mechanism after the forming operation performed therein is completed. As illustrated in Fig. 9, the precoiled fin delivery guide may comprise a drum 125 rotatably mounted on a shaft 126 supported by a bracket 127, fixed to the base 87. The drum is of slightly smaller diameter that the internal diameter of the precoiled fin 75, and may be of any desired length. The mechanism for receiving the finished coiled fin may comprise a similar drum 128 rotatably carried by a shaft 129 supported in a bracket 130 fixed to the base 87. The drums 125 and 128 may be of the same diameter and are of such size that the coiled ribbon readily clears these surfaces and slips on and off the drums without binding. The drums 125 and 128 are each disposed at a small angle to the axis of the fin turn passing between the beading machine rollers, so that adjacent turns are held out of contact with the parts of the machine, as shown in Fig. 9.

In the operation of the beading machine in completing the method of the invention, a section of the ribbon 75 that has been precoiled in the bending machine and carries the angularly bent inner edge portion 131 is placed on the guiding drum 125 and its leading end is started downward through the peripheral slot of the guide roller 120 and between the rollers 80 and 81. The four conical rollers 80, 81, 82 and 83 are rotated in the directions indicated by the arrows in Figs. 7 and 8, and the ribbon 75 is successively drawn between the conical surfaces of the cooperating pairs of rollers 80, 81, 82 and 83. The ribbon is tightly gripped by these rollers and as it passes between the first pair 80 and 81, the periphery of the cylindrical roller 84 bends the inner edge of the ribbon down against the end surface 112 carried by the roller 80 so that an L-shaped foot 132 lying at right angles to the body of the fin ribbon is formed. This bending action is illustrated in Figs. 7 and 10. The second pair of conical rollers 82 and 83 and a cooperating cylindrical roller 85 complete the bending operation and hold the foot and ribbon in proper bent relation. If desired, the clearance between the lower cylindrical roller 85 and the cooperating end faces on the conical rollers 82 and 83 may be less than that between the corresponding parts of the upper rollers 80, 81 and 84, so that the bending of the foot 132 to final form is accomplished in two steps. Where the composition of the fin metal or the dimensions of the fin ribbon permit, one of the sets of foot forming rollers may be omitted. During the bending operation, the shoulders formed by the beads 108 at the larger ends of the rollers 80 and 82 engage the outer edge of the fin ribbon and so limit its movement outwardly parallel to the conical roller surfaces. This insures a uniformly bent foot 132 of the desired dimensions. The ribbon is guided below the bending rollers by the guide roller 122.

The forming surfaces of the precoiling and ribbon beading machines are preferably formed of hardened and ground steel of high strength and quality. These surfaces include the marginal end faces 42 and 46 of the discs 41 and 44 as well as the pilot ring 49 in the precoiling machine, and the forming plates 109 and 113 and rollers 84 and 85 in the beading machine.

I claim:

1. Apparatus for continuously winding a metallic ribbon edgewise into a helical coil comprising, in combination, a pair of rotary discs having oppositely disposed end faces closely approaching each other at one point in their rotation and spaced more widely apart elsewhere, a circular shoulder on one of said discs, a ring between said discs surrounding said shoulder and having a circular outer surface adjacent said end faces at and adjacent said point, means for rotating said discs in unison and means for feeding a metallic ribbon between said end faces where said faces approach said point whereby said ribbon is gripped between said faces and bent around the outer surface of said ring.

2. Apparatus for continuously winding a metallic ribbon edgewise into a helical coil comprising, in combination, a pair of rotary discs having oppositely disposed end faces closely approaching each other at one point in their rotation and spaced more widely apart elsewhere, a circular shoulder on one of said discs, a circular ring of larger internal diameter than said shoulder disposed between said discs and surrounding said shoulder, said ring having a circular beveled outer surface, means for rotating said discs in unison and means for feeding a metallic ribbon between said disc end faces as said faces approach said point, whereby said ribbon is gripped between said faces and bent edgewise around the outer surface of said ring and the inner edge portion of said ribbon is bent at an angle to the remainder thereof by the bevel of said ring surface.

3. In mechanism for winding a metallic ribbon edgewise into a helical coil, in combination, a pair of circular forming discs having oppositely disposed adjacent marginal end faces, one of said discs having a smaller diameter than the other, a circular shoulder on one of said discs terminating radially inward of the marginal end face thereon, means for mounting said discs to rotate about closely adjacent axes disposed at a small angle to each other with their marginal end faces converging circumferentially to a closely adjacent point and their peripheries substantially aligned at said point and radially displaced elsewhere, a circular ring of larger internal diameter than said shoulder movably mounted between said discs and surrounding said shoulder and having a circular outer edge disposed adjacent the inner edges of said marginal end faces at said closely adjacent point, means for rotating said discs in unison and means for guiding a metallic ribbon between the marginal end faces of said discs into edgewise engagement with the outer edge of said ring where said faces approach said closely adjacent point, whereby the ribbon is gripped between said faces and bent around the outer edge of said ring and said ring moves eccentrically with respect to said discs and causes the bent ribbon to move radially outward beyond the edge of said smaller disc.

4. In mechanism for winding a metallic ribbon edgewise into a helical coil with its inner edge portion bent at an angle to the body thereof, in combination, a pair of circular forming discs having oppositely disposed adjacent marginal end faces, one of said discs having a smaller diameter than the other, a circular shoulder on the smaller of said discs terminating radially inward of the marginal end face of said disc, means for mounting said discs to rotate about closely adjacent axes disposed at a small angle to each other with said marginal end faces converging circumferentially to a closely adjacent point and their peripheries substantially aligned at said point and radially displaced elsewhere, a circular ring of larger internal diameter than said shoulder movably mounted between said discs and surrounding said shoulder and having a circular beveled outer edge disposed adjacent the inner edge of the said marginal end faces at said closely adjacent point, means for rotating said discs in unison and means for guiding a metallic ribbon between the marginal end faces of said discs into edgewise engagement with the beveled outer edge of said ring where such faces approach said closely adjacent point, whereby the ribbon is gripped between said faces and bent around the outer edge of said ring and the inner edge portion of said ribbon is angularly bent by the bevel of said ring edge.

5. In a mechanism for winding a metallic ribbon edgewise into a helical coil with its inner edge portion bent at an angle to the body thereof, in combination, a pair of circular forming discs having oppositely disposed adjacent marginal end faces, one of said discs having a smaller diameter than the other, a circular shoulder on the smaller of said discs terminating radially inward of the marginal end face of said disc, means for mounting said discs to rotate about closely adjacent axes disposed at a small angle to each other with said marginal end faces converging circumferentially to a closely adjacent point and their peripheries substantially aligned at said point and radially displaced elsewhere, means for adjustably varying the angle between the axes of said discs, a circular ring of larger internal diameter than said shoulder movably mounted between said discs and surrounding said shoulder and having a circular beveled outer edge disposed adjacent the inner edge of said marginal end faces at said closely adjacent point, means for rotating said discs in unison and means for guiding a metallic ribbon between the marginal end faces of said discs into edgewise engagement with the beveled outer edge of said ring where such faces approach said closely adjacent point, whereby the ribbon is gripped between said faces and bent around the outer edge of said ring and the inner edge portion of said ribbon is angularly bent by the bevel of said ring edge.

6. In mechanism for winding a metallic ribbon edgewise into a helical coil, in combination, a pair of circular forming discs having oppositely disposed adjacent marginal end faces, a circular beveled surface between said end faces, one of said discs having a larger diameter than the other, means for mounting said discs to rotate about closely adjacent axes disposed at a small angle to each other with their marginal end faces closely adjacent each other at one point of the circumference of said discs and spaced more widely apart over the rest of the circumference thereof, means for adjustably varying the angle between the axes of said discs, means for rotating said discs in the same direction at substantially the same angular velocity, and means for guiding a straight metallic ribbon between the marginal end faces of said discs and into edgewise contact with said circular surface at a point where such faces approach said closely adjacent point, whereby the ribbon is gripped between said faces and bent around said surface as said discs rotate and the inner edge portion of said ribbon is bent at an angle to the body thereof.

7. In mechanism for winding a metallic ribbon edgewise into a helical coil, in combination, a pair of circular forming discs having oppositely disposed adjacent marginal end faces, a circular surface between said end faces, one of said discs having a larger diameter than the other, means for mounting said discs to rotate about closely adjacent axes disposed at a small angle to each other with their marginal end faces closely adjacent each other and substantially peripherally aligned at one point of the circumference of said discs and spaced more widely apart and radially displaced over the rest of the circumference thereof, means for rotating said discs in the same direction at substantially the same angular velocity, a stationary ribbon guiding finger extending radially over the marginal end face of the larger of said discs to a point adjacent the periphery of the smaller of said discs adjacent the circumferential point where the end faces of said discs are most widely radially displaced, and means for guiding a straight metallic ribbon between the marginal end faces of said discs and into edgewise contact with said circular surface at a point where such faces approach said closely adjacent point, whereby the ribbon is gripped between said faces and bent around said surface as said discs rotate.

ERNEST BRUEGGER.

REFERENCES CITED

The following references are of record in the file of this patent:

UNITED STATES PATENTS

| Number | Name | Date |
| --- | --- | --- |
| 1,046,020 | Rhodes | Dec. 3, 1912 |
| 1,069,072 | Noll | July 29, 1913 |
| 1,623,766 | Way | Apr. 5, 1927 |
| 1,710,262 | Kellogg | Apr. 23, 1929 |
| 1,826,813 | Oberschulte | Oct. 13, 1931 |
| 1,878,233 | Dewald | Sept. 20, 1932 |
| 2,190,429 | Kellogg | Feb. 13, 1940 |
| 2,398,172 | Bruegger | Apr. 9, 1946 |